United States Patent
Chae et al.

(10) Patent No.: US 11,166,246 B2
(45) Date of Patent: Nov. 2, 2021

(54) METHOD AND DEVICE FOR TRANSMITTING SIDE LINK SIGNAL IN WIRELESS COMMUNICATION SYSTEM

(71) Applicant: LG Electronics Inc., Seoul (KR)

(72) Inventors: Hyukjin Chae, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/613,323

(22) PCT Filed: May 14, 2018

(86) PCT No.: PCT/KR2018/005494
§ 371 (c)(1),
(2) Date: Nov. 13, 2019

(87) PCT Pub. No.: WO2018/212526
PCT Pub. Date: Nov. 22, 2018

(65) Prior Publication Data
US 2020/0178192 A1      Jun. 4, 2020

Related U.S. Application Data

(60) Provisional application No. 62/506,545, filed on May 15, 2017, provisional application No. 62/505,978, filed on May 14, 2017.

(51) Int. Cl.
*H04W 56/00*     (2009.01)
*H04B 7/14*      (2006.01)

(52) U.S. Cl.
CPC .......... *H04W 56/0005* (2013.01); *H04B 7/14* (2013.01)

(58) Field of Classification Search
CPC . H04W 56/0005; H04W 56/00; H04W 92/18; H04B 7/14
See application file for complete search history.

(56) References Cited

U.S. PATENT DOCUMENTS

2014/0198716 A1* 7/2014 Speight ................. H04W 72/04
                                                             370/315
2015/0029866 A1    1/2015 Liao
(Continued)

FOREIGN PATENT DOCUMENTS

CN     106575993      4/2017
CN     108605213      9/2018
(Continued)

OTHER PUBLICATIONS

PCT International Search Report and Written Opinion in International Application No. PCT/KR2018/005494, dated Aug. 16, 2018, 21 pages (with English translation).
(Continued)

*Primary Examiner* — Hoang-Chuong Q Vu
(74) *Attorney, Agent, or Firm* — Fish & Richardson P.C.

(57) ABSTRACT

One embodiment of the present invention relates to a method for transmitting a side link signal in a wireless communication system by a UE operating in side link transmission mode 2, the method comprising: a step of receiving a predetermined signal by the UE; and a step of transmitting a side link signal on the basis of a first timing which is determined on the basis of the predetermined signal, wherein the first timing is determined differently depending on whether or not the UE establishes a connection with a relay UE. The UE is capable of communicating with at least one of another UE, a UE related to an autonomous driving vehicle, the BS or a network.

13 Claims, 12 Drawing Sheets

(56) References Cited

U.S. PATENT DOCUMENTS

| | | | |
|---|---|---|---|
| 2016/0044618 A1 | 2/2016 | Sheng et al. | |
| 2016/0057718 A1* | 2/2016 | Sorrentino | H04W 72/0446 |
| | | | 370/350 |
| 2016/0302246 A1* | 10/2016 | Chervyakov | H04L 5/1469 |
| 2017/0019886 A1* | 1/2017 | Patel | H04W 76/14 |
| 2017/0150314 A1* | 5/2017 | Hwang | G01S 5/00 |
| 2017/0295601 A1 | 10/2017 | Kim et al. | |
| 2017/0302359 A1* | 10/2017 | Guo | H04B 7/155 |
| 2018/0102807 A1* | 4/2018 | Chen | H04L 25/03821 |
| 2018/0167904 A1* | 6/2018 | Lee | H04W 56/0045 |
| 2018/0324842 A1* | 11/2018 | Gulati | H04W 72/1263 |
| 2018/0324882 A1* | 11/2018 | Gulati | H04W 76/14 |
| 2018/0352525 A1* | 12/2018 | Li | H04B 7/2125 |
| 2019/0037622 A1* | 1/2019 | Blasco Serrano | H04W 76/14 |
| 2019/0045468 A1* | 2/2019 | Blasco Serrano | H04W 56/002 |
| 2019/0223241 A1* | 7/2019 | Manolakis | H04W 76/14 |

FOREIGN PATENT DOCUMENTS

| | | |
|---|---|---|
| WO | WO2016164084 | 10/2016 |
| WO | WO2016185285 | 11/2016 |
| WO | WO2017134235 | 8/2017 |
| WO | WO2016185967 | 3/2018 |

OTHER PUBLICATIONS

CN Office Action in Chinese Appln. No. 201880031754.X, dated Mar. 25, 2021, 22 pages (with English translation).

EP Extended European Search Report in European Appln. No. 18802100.0, dated Feb. 12, 2021, 9 pages.

Yuanjian, "The study of channel allocation strategies in GPRS/EDGE," South China University of Technology Guangzhou,China, A Dissertation Submitted for the Degree of Master, 2012, 68 pages (with English Abstract).

* cited by examiner (a)

(b)

(a)

(b)

METHOD AND DEVICE FOR TRANSMITTING SIDE LINK SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2018/005494, filed on May 14, 2018, which claims the benefit of U.S. Provisional Application No. 62/506,545, filed on May 15, 2017, and U.S. Provisional Application No. 62/505,978, filed on May 14, 2017. The disclosures of the prior applications are incorporated by reference in their entirety.

TECHNICAL FIELD

The present disclosure relates to a wireless communication system, and more particularly, to a method of transmitting and receiving a sidelink signal by a remote user equipment (UE) operating in a sidelink transmission mode different from that of a relay UE and device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

The object of the present disclosure is to provide how to solve a transmission timing problem in D2D or V2X communication, which is caused when a remote UE and a relay UE operate in different sidelink transmission modes.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of transmitting a sidelink signal by a UE operating in sidelink transmission mode 2 in a wireless communication system. The method may include receiving, by the UE, a predetermined signal and transmitting the sidelink signal with respect to a first timing determined based on the predetermined signal. In this case, the first timing may vary depending on whether the UE establishes a connection with a relay UE.

In another aspect of the present disclosure, provided is a UE for transmitting a sidelink signal and operating in sidelink transmission mode 2 in a wireless communication system. The UE may include a transmitter, a receiver, and a processor. The processor may be configured to receive a predetermined signal and transmit the sidelink signal with respect to a first timing determined based on the predetermined signal. In this case, the first timing may vary depending on whether the UE establishes a connection with a relay UE.

When the UE is connected to the relay UE, the first timing may be obtained by applying a timing advance (TA) to a reference timing.

When the UE is not connected to the relay UE, the first timing may be the reference timing.

The TA may be a value received from the relay UE.

The TA may be a value obtained by applying a predetermined offset to a value received from the relay UE.

The TA may be a value obtained by applying a predetermined scaling factor to a value received from the relay UE.

The reference timing may be a timing at which a sidelink synchronization signal is received.

The predetermined signal may be a sidelink synchronization signal.

The relay UE may operate in sidelink transmission mode 1.

The TA may be transmitted through physical layer signaling or higher layer signaling.

The TA may be transmitted to the UE over a physical sidelink broadcast channel (PSBCH).

When the TA is more than or equal to a predetermined value and the relay UE operates in sidelink transmission mode 1, the UE may exclude a subframe immediately before a subframe transmitted by the relay UE in selecting a transmission resource.

ADVANTAGEOUS EFFECTS

According to the present disclosure, communication may be smoothly performed without a transmission timing problem caused by different sidelink transmission modes of remote and relay UEs.

It will be appreciated by persons skilled in the art that the effects that may be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the disclosure. In the drawings.

BEST MODE

Figure 1:
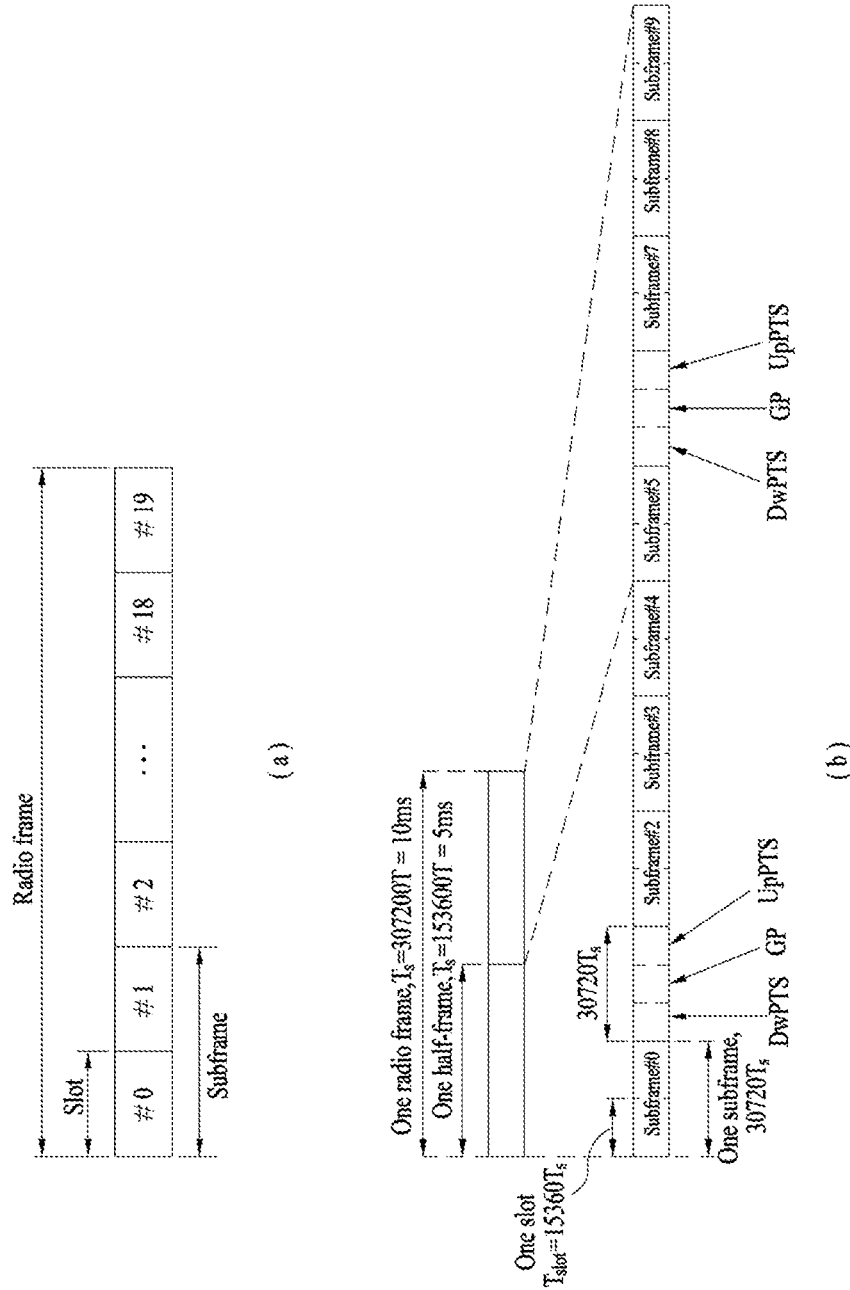
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure may be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure may be supported by those documents. Further, all terms as set forth herein may be explained by the standard documents.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX may be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
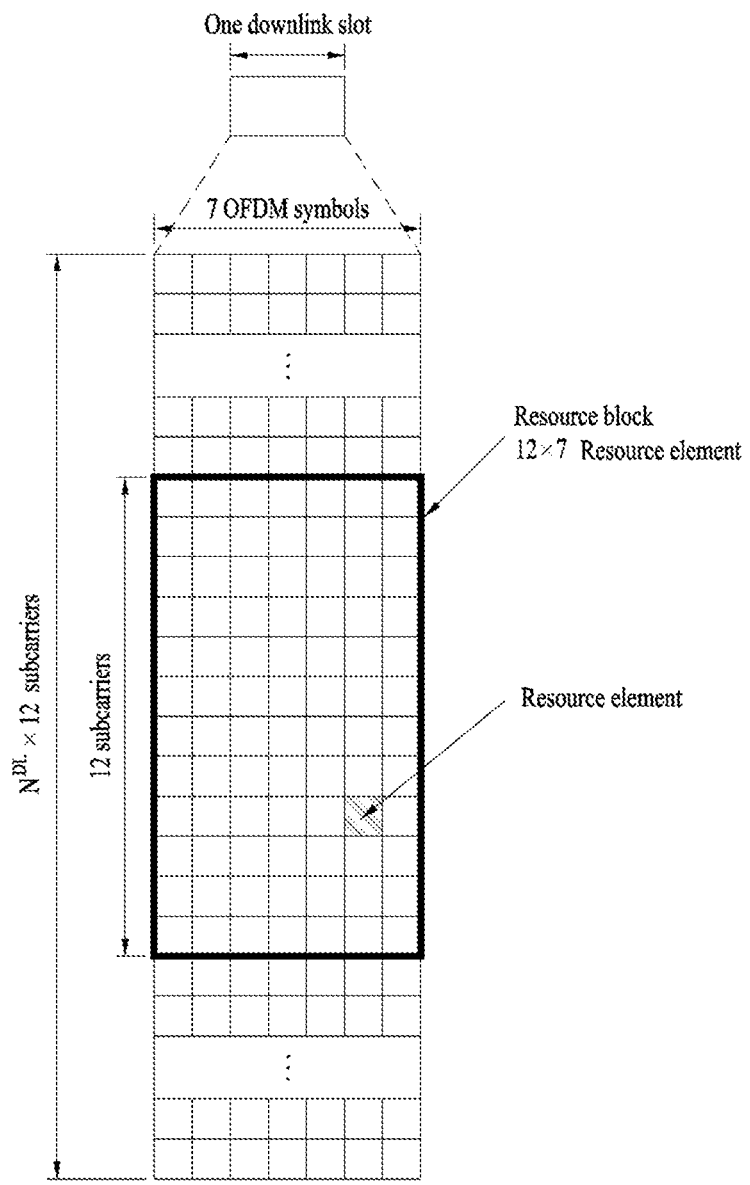
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
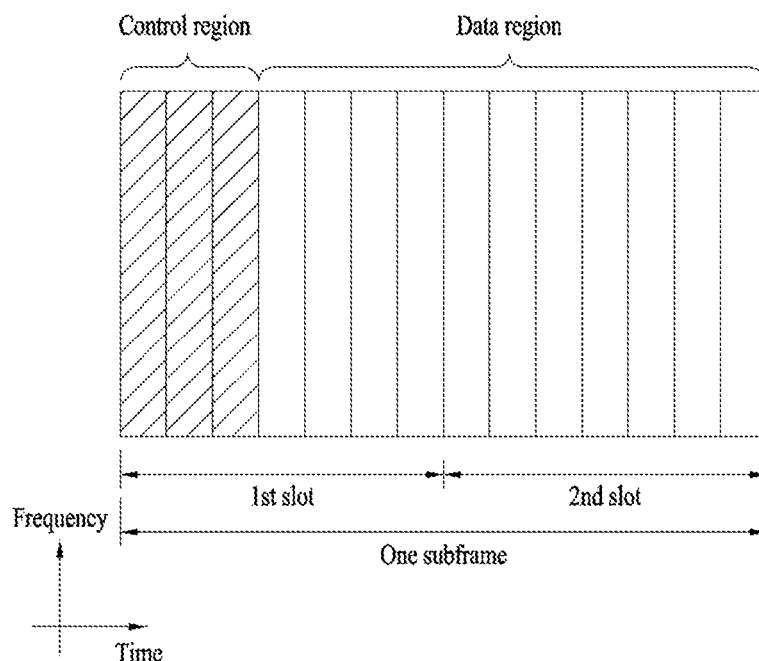
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
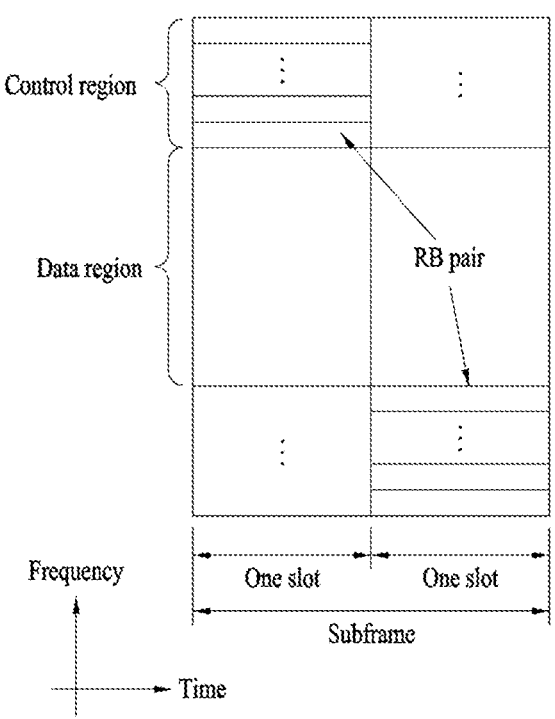
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE may demodulate the data by measuring a channel using the RS. This RS should be transmitted in a data transmission area.

Modeling of MIMO System

Figure 5:
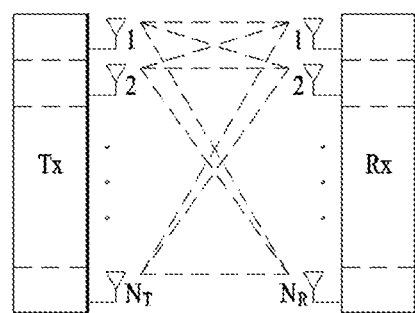
FIG. 5 is a view illustrating the configuration of a wireless communication system having multiple antennas.
Figure 5:
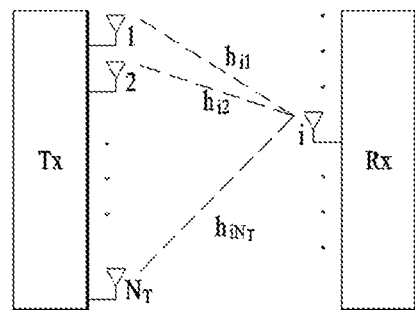

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system may be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling may be represented as follows. It is assumed that there are $N_T$ Tx antennas and $N_R$ Rx antennas.

Regarding a transmitted signal, if there are $N_T$ Tx antennas, the maximum number of pieces of information that may be transmitted is $N_T$. Hence, the transmission information may be represented as shown in Equation 2.

$$S = [S_1, S_2, \ldots, S_{N_T}]^T \quad \text{[Equation 2]}$$

Meanwhile, transmit powers may be set different from each other for individual pieces of transmission information $S_1, S_2, \ldots, S_{N_T}$, respectively. If the transmit powers are set to $P_1, P_2, \ldots, P_{N_T}$, respectively, the transmission information with adjusted transmit powers may be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ may be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas may be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i may be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas may be expressed as follows.

$$n = [n_1, n_2, \ldots, n_{N_R}]^T \quad \text{[Equation 9]}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns.

The rank rank(H) of the channel matrix H is restricted as follows.

$$\text{rank}(H) \leq \min(N_T, N_R) \quad \text{[Equation 11]}$$

Additionally, the rank of a matrix may also be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix may be the maximum number of channels through which different pieces of information may be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
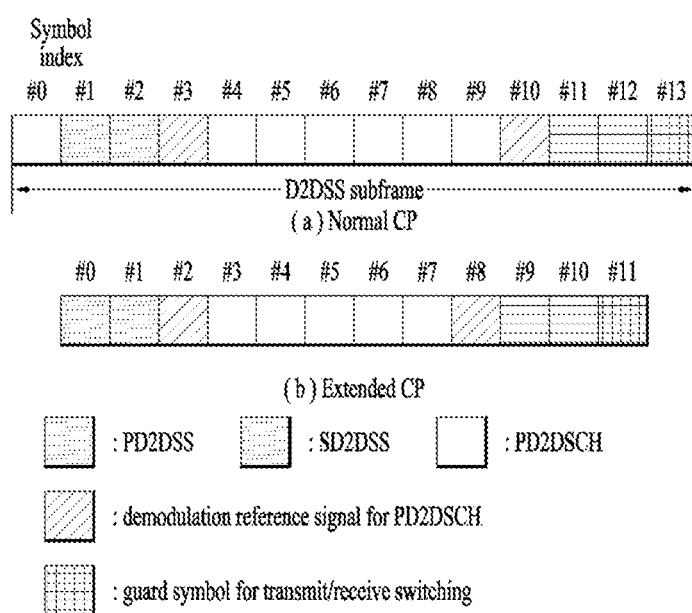
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS may be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
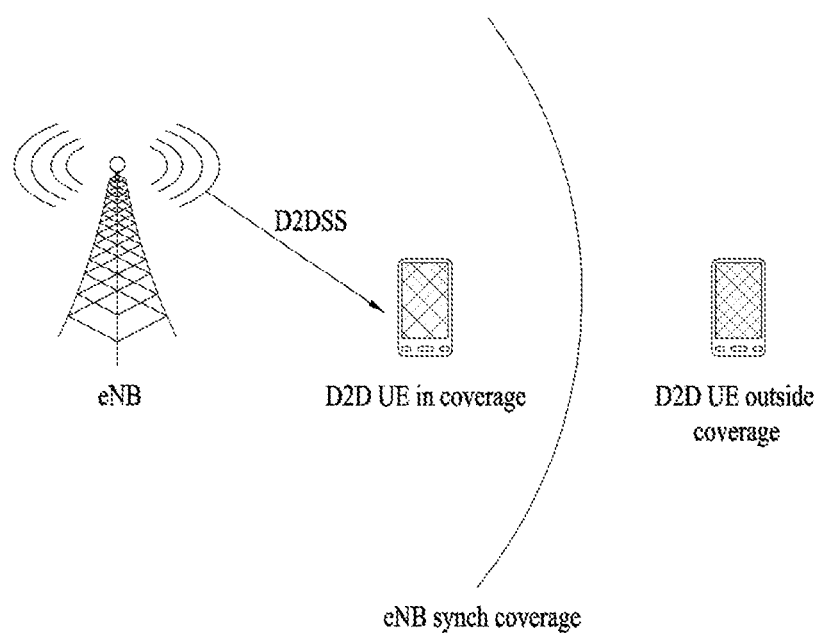
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
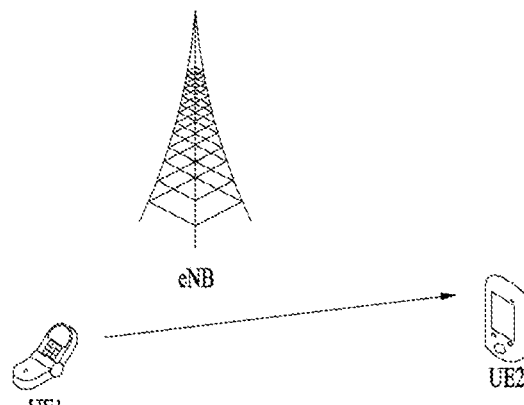
FIG. 8 is a view illustrating an exemplary D2D resource pool for D2D communication.
Figure 8:
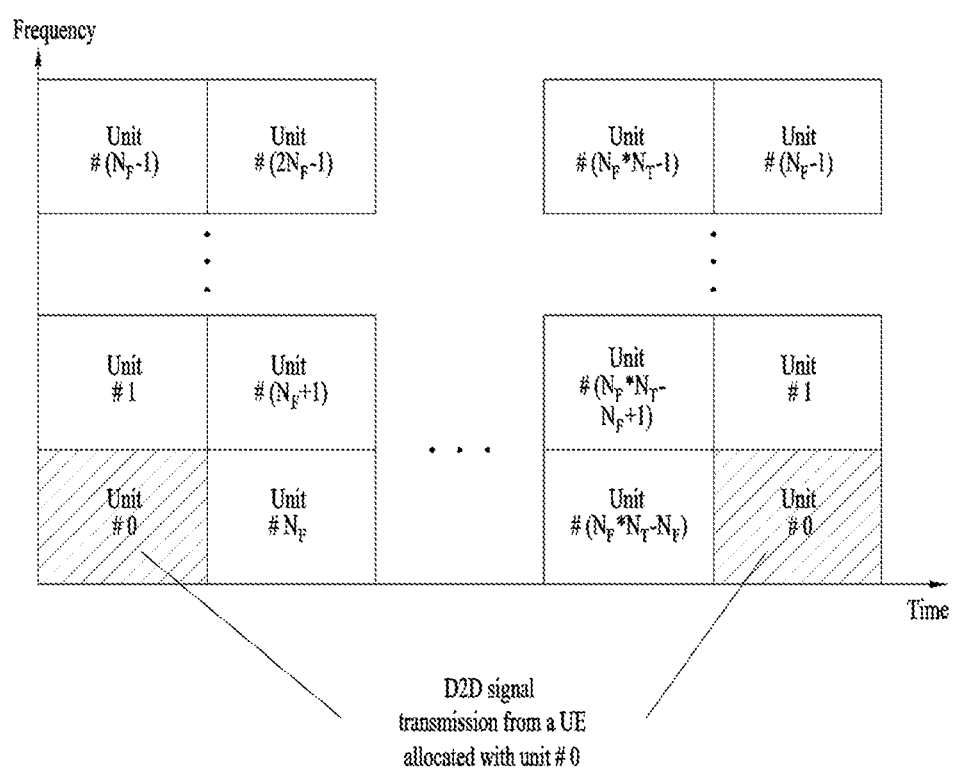

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB may inform UE1 of the resource pool. If UE1 is located at the outside of coverage of the eNB, the resource pool may be informed by a different UE or may be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F \times N_T$ number of resource units in total. In particular, a resource pool may be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool may be classified into various types. First of all, the resource pool may be classified according to contents of a D2D signal transmitted via each resource pool. For example, the contents of the D2D signal may be classified into various signals and a separate resource pool may be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal may be transmitted on an identical resource unit in a manner of being multiplexed with D2D data. In this case, an SA resource pool may correspond to a pool of resources that an SA and D2D data are transmitted in a manner of being multiplexed. The SA signal may also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information may be transmitted only in a resource pool for the D2D data channel. In other word, REs, which are used to transmit SA information in a specific resource unit of an SA resource pool, may also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal may be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as mode 1 (mode 3 in case of V2X). If a transmission resource region is configured in advance or an eNB designates the transmission resource region and a UE directly selects a transmission resource from the transmission resource region, it is referred to as mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
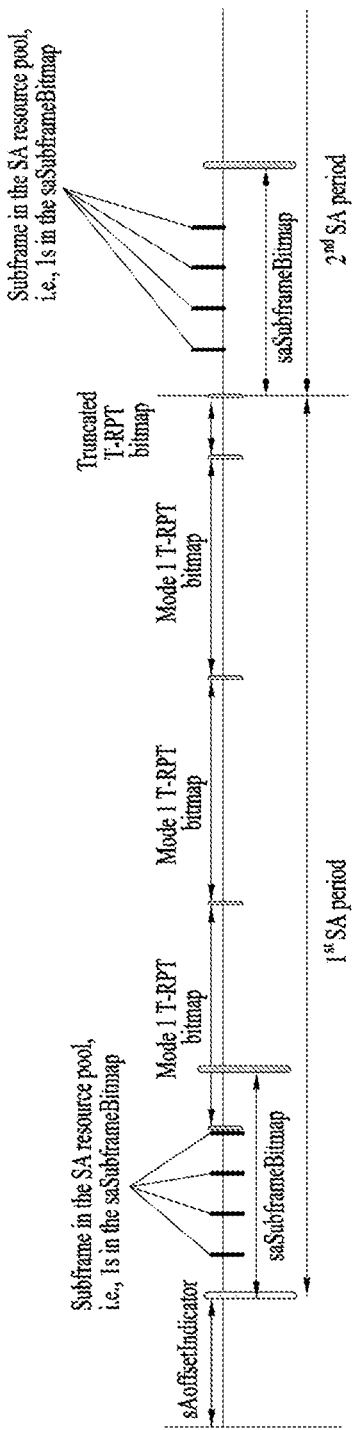
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to 1 s set in a T-RPT bitmap in an indicated T-RPT, and transmits one medium access control layer protocol data unit (MAC PDU) four times.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 10:
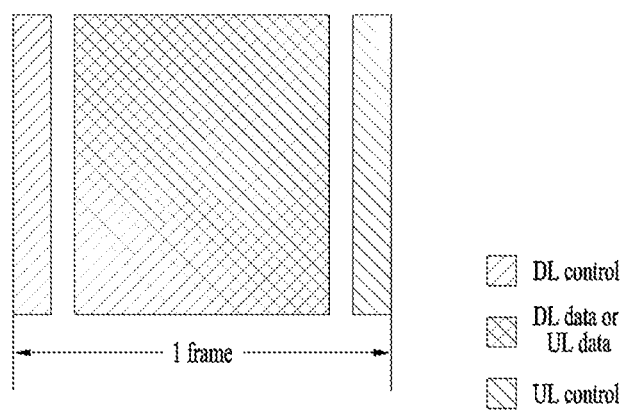
FIGS. 10 and 11 are views illustrating exemplary new radio access technology (NRAT) frame structures.
Figure 11:
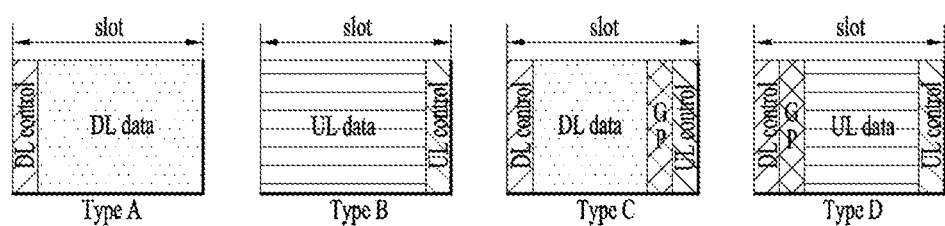

FIG. 10 illustrates an exemplary frame structure available for NR. Referring to FIG. 10, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like).

Embodiments

In D2D sidelink transmission mode 1 (mode 1), a UE may signal a TA indicated by an eNB to another UE by including the TA in SCI, which is transmitted on a PSCCH. In the RRC connected mode, the UE operates under control of the eNB. In this case, the UE may apply the TA to sidelink transmission to minimize interference to cellular systems and allow the eNB to explicitly recognize a sidelink transmission resource. In mode 2, the UE may set the TA to 0 and transmit/receive a sidelink signal with respect to a DL timing or its synchronization reference timing. In mode 2, it is generally assumed that the UE operates in the RRC idle mode. In this case, since the UE is incapable of receiving TA information from the eNB, the UE may perform sidelink transmission and reception with TA=0, i.e., with respect to the DL timing or synchronization reference timing. However, if a relay UE operates in mode 1 and a remote UE operates in mode 2, the relay and remote UEs may have different timings since whether the TA is applied depends on the mode, and as a result, there may be a partial overlap between subframes. In particular, since the relay UE needs to communicate with a network (the relay UE needs to forward a signal from the remote UE to the eNB or forward a signal from the eNB to the remote UE), the relay UE is expected to operate in mode 1. On the other hand, since the remote UE may be out of coverage of the eNB, the remote UE is expected to operate in mode 2. Since the two different modes have different transmission timings, there may be an overlap between subframe boundaries. In the following, a description will be given of a relay sidelink signal transmission/reception method capable of resolving such a timing difference.

According to an embodiment, a UE operating in sidelink transmission mode 2 may receive a predetermined signal, determine a first timing based on the predetermined signal, and then transmit a sidelink signal with respect to the first timing.

The first timing may vary (or may be determined) depending on whether the UE establishes a connection with a relay UE. In general, when a remote UE is connected to a relay UE, the remote UE may use a TA transmitted from the relay UE in determining its transmission timing. Specifically, when the UE is connected to the relay UE, the first timing is obtained by applying a TA to a reference timing. When the UE is not connected to the relay UE, the first timing may be the reference timing. The TA may be a value received from the relay UE, a value obtained by applying a predetermined offset to the value received from the relay UE, or a value obtained by applying a predetermined scaling factor to the value received from the relay UE. The value of the offset or scaling factor may be preconfigured, signaled by the network, or autonomously determined by the UE.

The reference timing may be a timing at which a sidelink synchronization signal is received. The predetermined signal may be the sidelink synchronization signal. The relay UE may operate in sidelink transmission mode 1.

Figure 12:
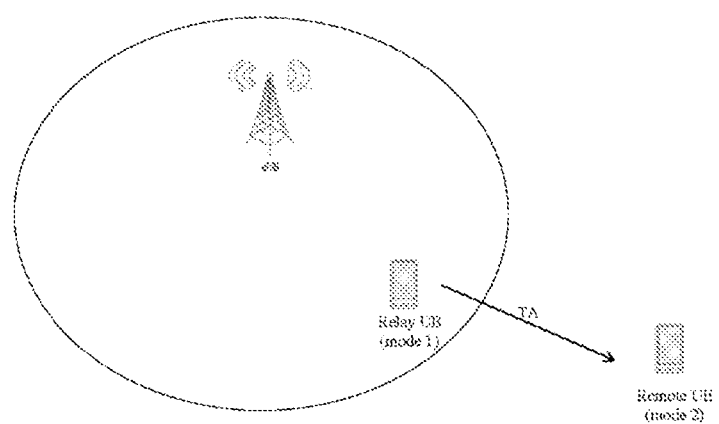
FIG. 12 is a view illustrating an example of the present disclosure.

The above operations are described with reference to FIG. 12. When a remote UE (operating in mode 2) receives a TA value from a relay UE (operating in mode 1), the remote UE may determine its transmission timing by applying a TA recognized upon receipt of an SA of the mode-1 UE (i.e., relay UE) to a timing at which an sidelink synchronization signal (SLSS) (of the relay UE) is received. Before establishing a connection with the relay UE, the remote UE operates with respect to an existing timing (reference timing) (e.g., a timing configured/determined by the UE or a transmission timing determined based on the SLSS reception timing). However, after completing the connection setup with the relay UE, the remote UE may perform transmission and reception by applying a predetermined TA (e.g., a TA received from the relay UE, a value obtained by applying a predetermined offset to the TA received from the relay UE, or a value by scaling the TA received from the relay UE) (to the reference timing). When the connection setup between the relay and remote UEs is terminated, the remote UE may use the existing timing (i.e., timing used before the connection setup) again to transmit and receive a sidelink signal.

The TA may be preconfigured or transmitted through physical layer signaling or higher layer signaling. In general, the network may know an average TA of the relay UE and inform the remote UE of the average TA. Then, the remote UE may determine its data signal transmission timing based on the average TA. However, when there is a change in the average TA (when the average TA is different from that in a preconfiguration), the relay UE may signal to the relay UE the TA value to be used by the remote UE through physical layer signaling or higher layer signaling. The TA may be transmitted to the UE over a physical sidelink broadcast channel (PSBCH). Specifically, the relay UE may transmit the TA to the remote UE using a reserved field in the PSBCH.

If the TA is more than a predetermined value and the relay UE operates in sidelink transmission mode 1, the UE may exclude a subframe immediately before the subframe used by the relay UE for transmission in selecting a transmission resource. Specifically, when the relay UE operates in mode 1 and the TA is more than or equal to one symbol, if the remote UE performs transmission in the subframe before the subframe used by the relay UE for data transmission, there may be a partial overlap. Thus, it may be regulated that when the TA of the relay UE is more than the predetermined threshold (the threshold may be predetermined or signaled by the network through physical layer signaling or higher layer signaling), the remote UE does not select (a resource included in) the subframe immediately before the subframe used by the relay UE as the transmission resource. The remote UE may determine whether to perform such operation by receiving the TA value of the relay UE, but the relay UE may instruct the remote UE to perform the operation using a 1-bit indicator.

Meanwhile, when the relay UE is connected to the remote UE, the relay UE may perform the sidelink transmission and reception based on the DL timing even though the relay UE operates in mode 1. In this case, since the relay UE changes its timing, the relay UE may smoothly perform the sidelink communication with the remote UE. To this end, the relay UE may report to the eNB that the relay UE is connected to the remote UE, and the eNB may change the sidelink transmission timing of the relay UE to the DL timing. Alternatively, after establishing the connection to the remote UE, the relay UE may change its transmission timing to the DL timing instead of using the TA indicated by the eNB.

When the relay UE operates in mode 1, the relay UE may be allocated an SLSS resource, an SLSS ID, and/or PSBCH contents from the eNB. The relay UE may perform transmission on such a resource by applying the TA to an SLSS. The SLSS resource, SLSS ID, and/or PSBCH contents may be predetermined or signaled to the remote UE (from the relay UE or the eNB) through physical layer signaling or higher layer signaling. Thus, the remote UE may efficiently discover the synchronization signal of the relay UE. When the remote UE synchronizes based on the SLSS of the relay UE, the remote UE may naturally transmit and receive a signal by applying the TA. To this end, when the relay UE operates in mode 1, the relay UE may also transmit a discovery signal by applying the TA.

As another method, while the relay UE communicates with the remote UE using an existing SLSS, if the relay UE successfully establishes a connection with the remote UE and currently uses mode 1, the relay UE use a separate ID or a separate resource for SLSS transmission by applying the TA. According to this method, the relay UE may apply the TA to the SLSS only when using mode 1 after establishing the connection, instead of applying the TA to the SLSS at all times. Thus, the relay UE may smoothly perform the communication while minimizing the effects on other D2D UEs. This method may be interpreted as follows. At least one of an SLSS ID, a SLSS transmission resource, PSBCH contents, or a SLSS transmission timing may be changed before and after the relay UE is connected to the remote UE. The purpose of this method is to perform the sidelink transmission and reception more smoothly and minimize the effects on other UEs.

The above-described operations may be applied to both D2D discovery and D2D communication or applied only when a specific physical channel is used. For example, in the case of a PSCCH, transmission and reception may be performed with respect to an existing timing, but in the case of a PSSCH, one of the proposed method may be used for transmission. In this case, some of the proposed operations may be applied selectively only when a specific condition is satisfied. For example, the operations may be applied when the relay or remote UE discovers a peer UE or when the connection setup between the relay and remote UEs is completed.

In the above description, when it is said that the relay UE operates in mode 1, it may mean that the relay UE performs the sidelink transmission and reception using the TA. Meanwhile, when it is said that the remote UE operates in mode 2, it may mean that the remote UE uses the DL timing or SLSS reception timing.

The present disclosure is not limited to direct communication between UEs. In other words, the disclosure is applicable to UL or DL communication, and in this case, the proposed methods may be used by an eNB, a relay node, etc.

Since each of the examples of the proposed methods may be included as one method for implementing the present disclosure, it is apparent that each example may be regarded as a proposed method. In addition, although the proposed methods may be implemented independently, some of the proposed methods may be combined (or merged) for implementation. Moreover, it may be regulated that information on whether the proposed methods are applied (or information on rules related to the proposed methods) should be transmitted from an eNB to a UE through a predefined signal (e.g., a physical layer signal, a higher layer signal, etc.). Alternatively, it may be regulated that a transmitting UE signals such information to a receiving UE or the receiving UE requests the transmitting UE to transmit the information.

For example, when a specific MCS or modulation order is used, a network may signal to a UE whether PSCCH power boosting is performed through physical layer signaling or higher layer signaling. The signaling may be configured separately for each resource region or applied to all UEs participating D2D communication. If 64-QAM is used, the network may signal to the UE whether a PSCCH power offset is applied through higher layer signaling or preconfigure whether the PSCCH power offset is applied.

Device Configurations According to Embodiments of the Present Disclosure

Figure 13:
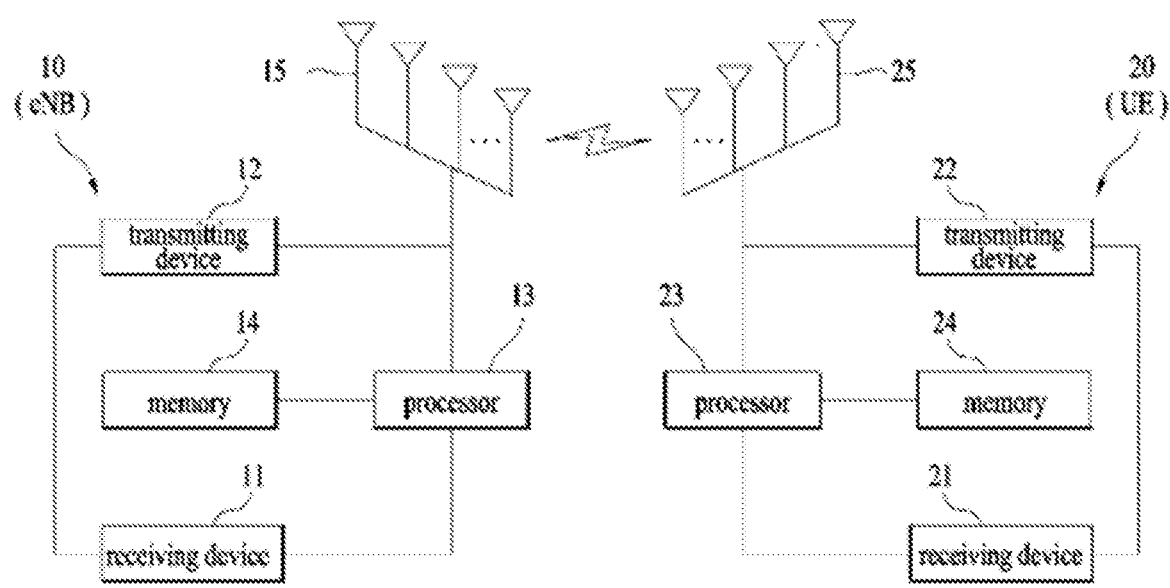
FIG. 13 is a view illustrating the configurations of a transmitting and receiving devices.

FIG. 13 is a diagram illustrating the configurations of a transmission point device and a UE device according to embodiments of the present disclosure.

Referring to FIG. 13, the transmission point device 10 may include a reception device 11, a transmission device 12, a processor 13, a memory 14, and a plurality of antennas 15. The plurality of antennas 15 may mean that the transmission point device 10 supports multiple-input multiple-output (MIMO) transmission and reception. The reception device 11 may be configured to receive various signals, data, and information from the UE in UL. The transmission device 12 may be configured to transmit various signals, data, and information to the UE in DL. The processor 13 may be configured to control overall operations of the transmission point device 10. The processor 13 of the transmission point device 10 according to an embodiment of the present disclosure may be configured to perform the operations described in the above examples.

In addition, the processor 13 of the transmission point device 10 may be configured to perform functions of processing information received by the transmission point device 10 or information to be transmitted to the outside. The memory 14 may be configured to store the processed information during a prescribed time period, and it may be replaced with a component such as a buffer (not shown in the drawing).

With continued reference to FIG. 13, the UE device 20 may include a reception device 21, a transmission device 22, a processor 23, a memory 24, and a plurality of antennas 25. The plurality of antennas 25 may mean that the UE device 20 supports MIMO transmission and reception. The reception device 21 may be configured to receive various signals, data, and information from an eNB in DL. The transmission device 22 may be configured to transmit various signals, data, and information to the eNB in UL. The processor 23 may be configured to control overall operations of the UE device 20.

The processor 23 of the UE device 20 according to an embodiment of the present disclosure may be configured to perform the operations described in the above examples. Specifically, the processor 23 may be configured to receive a predetermined signal and transmit a sidelink signal with respect to a first timing determined based on the predetermined signal. In this case, the first timing may vary depending on whether the UE establishes a connection with a relay UE.

In addition, the processor 23 of the UE device 20 may be configured to perform functions of processing information received by the UE device 20 or information to be transmitted by the UE device 20. The memory 24 may be configured to store the processed information during a prescribed time period, and it may be replaced with a component such as a buffer (not shown in the drawing).

The transmission point device 10 and the UE device 20 may be implemented such that the above-described embodiments of the present disclosure are independently implemented or two or more embodiments are simultaneously implemented. Here, redundant descriptions are omitted for clarity.

The details of the transmission point device 10 in FIG. 13 may be equally applied to a relay device operating as a downlink transmission entity or an uplink reception entity, and the details of the UE device 20 in FIG. 13 may be equally applied to a relay device operating as a downlink reception entity or an uplink transmission entity.

The embodiments of the present disclosure may be implemented through various means, for example, in hardware, firmware, software, or a combination thereof.

In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method of transmitting a sidelink signal by a user equipment (UE) operating in sidelink transmission mode 2 in a wireless communication system, the method comprising:
   receiving, by the UE, a predetermined signal; and
   transmitting the sidelink signal with respect to a first timing determined based on the predetermined signal,
   wherein the first timing varies depending on whether the UE establishes a connection with a relay UE, and
   wherein based on a timing advance (TA) being greater than a predetermined value and the relay UE operating in sidelink transmission mode 1, the UE excludes a subframe immediately before a subframe transmitted by the relay UE in selecting a transmission resource.

2. The method of claim 1, wherein based on the connection between the UE and the relay UE, the first timing is obtained by applying the TA to a reference timing.

3. The method of claim 2, wherein based on skipping the connection between the UE and the relay UE, the first timing is the reference timing.

4. The method of claim 2, wherein the TA is a value received from the relay UE.

5. The method of claim 2, wherein the TA is a value obtained by applying a predetermined offset to a value received from the relay UE.

6. The method of claim 2, wherein the TA is a value obtained by applying a predetermined scaling factor to a value received from the relay UE.

7. The method of claim 2, wherein the reference timing is a timing at which a sidelink synchronization signal is received.

8. The method of claim 1, wherein the predetermined signal is a sidelink synchronization signal.

9. The method of claim 1, wherein the relay UE operates in the sidelink transmission mode 1.

10. The method of claim 1, wherein the TA is transmitted through physical layer signaling or higher layer signaling.

11. The method of claim 1, wherein the TA is transmitted to the UE over a physical sidelink broadcast channel (PSBCH).

12. A user equipment (UE) configured to transmit a sidelink signal and operate in sidelink transmission mode 2 in a wireless communication system, the UE comprising:
   a transmitter;
   a receiver; and
   a processor,
   wherein the processor is configured to receive a predetermined signal and transmit the sidelink signal with respect to a first timing determined based on the predetermined signal, and
   wherein the first timing varies depending on whether the UE establishes a connection with a relay UE, and
   wherein based on a timing advance (TA) being greater than a predetermined value and the relay UE operating in sidelink transmission mode 1, the UE excludes a subframe immediately before a subframe transmitted by the relay UE in selecting a transmission resource.

13. The UE of claim 12, wherein the UE is configured to communicate with at least one of another UE, a UE related to an autonomous driving vehicle, a base station (BS), or a network.

* * * * *